United States Patent [19]

Kang

[11] Patent Number: 5,787,726
[45] Date of Patent: Aug. 4, 1998

[54] AMMONIA AQUA ABSORPTION TYPE HEAT PUMP

[75] Inventor: In-Seak Kang, Seoul, Rep. of Korea

[73] Assignee: LG Electronics, Inc., Rep. of Korea

[21] Appl. No.: 819,257

[22] Filed: Mar. 18, 1997

[30] Foreign Application Priority Data

Mar. 26, 1996 [KR] Rep. of Korea ............. 1996-8443

[51] Int. Cl.$^6$ .................................................. F25B 33/00
[52] U.S. Cl. ..................... 62/495; 62/476; 62/101
[58] Field of Search ........................ 62/495, 497, 476, 62/101

[56] References Cited

U.S. PATENT DOCUMENTS

| | | | |
|---|---|---|---|
| 2,252,791 | 8/1941 | Ullstrand | 62/495 |
| 2,750,763 | 6/1956 | Kogel | 62/495 |

Primary Examiner—William Doerrler
Attorney, Agent, or Firm—Ostrolenk, Faber, Gerb & Soffen, LLP

[57] ABSTRACT

An AAATHP is designed to make the non-evaporated liquid refrigerant stemming from the evaporator according to the operational condition of the AAATHP to rectify the refrigerant vapor to be sent to the rectifier from the regenerator, thus improving the efficiency of the rectifier and safely maintaining the operational system of the AAATHP. The AAATHP comprises the following parts: An automatic switch valve to send liquid refrigerant accumulated at the bottom of the evaporator. The heat exchanging pipe enables the liquid refrigerant formed by the evaporator to flow in the rectifier so as to enable the liquid refrigerant sent out by the automatic switch valve to exchange its heat with the refrigerant vapor coming to the rectifier from the regenerator. A first liquid refrigerant passage pipe formed between the automatic switch valve and the heat exchanging pipe sends the liquid refrigerant accumulated at the bottom of the evaporator to the heat exchanging pipe. A second liquid refrigerant passage pipe enables the flow of the liquid refrigerant into the evaporator together with the liquid refrigerant condensed by the condenser.

15 Claims, 2 Drawing Sheets

5,787,726

AMMONIA AQUA ABSORPTION TYPE HEAT PUMP

BACKGROUND OF THE INVENTION

The present invention relates to an ammonia aqua absorption type heat pump (AAATHP), and more particularly, to a rectifier, a regenerator and an evaporator to rectify the refrigerant vapor to be sent to the rectifier from the regenerator by using non-evaporated liquid refrigerant stemming according to changes in the operational condition of the evaporator.

As shown in FIG. 1, a conventional ammonia aqua absorption type heat pump comprises the following elements:

A regenerator 1 acquiring ammonia refrigerant vapor by evaporating refrigerant ammonia from strongly concentrated operating fluid (ammonia solution) by adding heat emitting from a burner 9, and producing weakly concentrated ammonia solution (hereinafter referred to as weak solution); a rectifier 7 acquiring highly concentrated ammonia vapor by condensing water evaporated along with the refrigerant vapor evaporated from the regenerator 1, a condenser 2 condensing the refrigerant vapor sent from the regenerator I by absorbing its heat with the use of water coming from an indoor unit 10 or an outdoor unit (not shown in the drawings) after being reduced of their temperatures, an evaporator 3 producing refrigerant vapor by re-evaporizing the liquid refrigerant sent from the condenser 2 with the use of water coming from the indoor unit 10 or an outdoor unit after being increased of its temperature, a refrigerant heat exchanger 5 formed to enable the exchange of heat between the liquid refrigerant stemming from the condenser 2 and the refrigerant vapor stemming from the evaporator 3, and an absorber 4 enabling the weak solution sent from the regenerator 1 to absorb the refrigerant vapor sent from the evaporator 3 to make the strong solution of the original concentration of the regenerator 1.

The operational motion of the conventional AAATHP and problems thereof are as follows:

As shown in the FIG. 1, the conventional AAATHP includes basically four components such as a regenerator 1, a condenser 2, an evaporator 3 and an absorber 4.

By adding heat emitting from the burner 9, the regenerator 1 produces ammonia refrigerant vapor by evaporating the refrigerant ammonia from the strongly concentrated operating fluid (ammonia solution).

The regenerator 1 also acquires weakly concentrated ammonia solution (weak solution) deriving from partially evaporated ammonia. The refrigerant vapor evaporated from the regenerator I is sent to the condenser 2.

The refrigerant vapor sent to the condenser 2 is formed into liquid refrigerant after being absorbed of its heat by the water coming from the indoor unit 10 after its temperature was lowered by performing the heating.

The water, after absorbing the heat from the refrigerant vapor, is sent to the absorber 4 again through the condenser 2.

The liquid refrigerant sent from the condenser 2 is evaporated again by the evaporator 3, and is formed into refrigerant vapor. At this time, the quantity of heat needed to evaporate the liquid refrigerant is supplied by the heated water returned to the evaporator 3 from the indoor unit 10 after performing the heating.

After being absorbed of the quantity of heat as described above, the temperature of the water is further lowered and is then sent to the indoor unit 10 again for cooling.

The absorber 4 makes the weal solution sent from the regenerator 1 to absorb the refrigerant vapor sent from the evaporator 3 to produce the strong solution of the original concentration of the regenerator 1.

At this time, the quantity of heat must be eliminated to facilitate the absorption described above. For the elimination of the quantity of heat, the water used by the condenser 2 is utilized.

After having absorbed the quantity of heat, the water is sent to the indoor unit 10 again for heating.

In other words, when performing the cooling, the water with its temperature lowered at the evaporator 3 is sent to the indoor unit 10 for cooling, and the water heated after cooling the condenser 2 and absorber 4 is sent to an outdoor unit for cooling down its temperature again.

When performing the heating, contrary to the above, the water with its temperature increased while going through the condenser 2 and the absorber 4 is sent to the indoor unit 10 to performing the heating, and the water used by the evaporator 3 is sent to the outdoor unit.

At this time, in order to increase the effect of the AAATHP, additional devices are also established. The devices include a solution separator 6 separating drops coming with the refrigerant vapor evaporating from the regenerator 1, and a rectifier 7 condensing water evaporating with the refrigerant vapor coming from the solution separator 6 to produce highly concentrated ammonia vapor.

At this time, a medium condensing the water is the low temperature strong solution to be sent from a solution pump 8. While flowing in a coil winding inside the rectifier 7, the high temperature strong solution exchanges heat with the refrigerant vapor to condense the moisture contained in the refrigerant vapor.

Through the exchange of heat between liquid refrigerant stemming from the condenser 2 and refrigerant vapor stemming from the evaporator 3, the refrigerant heat exchanger 5 reduces the temperature of the liquid refrigerant near to the evaporating temperature of the evaporator 3. At the same time, the refrigerant heat exchanger 5 also increases the temperature of the refrigerant vapor close to the saturation temperature of the absorber 4 to accelerate the operational motion of absorption.

In conjunction with the operational motion of the above, even an extremely small amount of refrigerant remaining inside the evaporator 3 is also evaporated at the same time.

During the operational stage of the above system, the regenerator 1 and the condenser 2 form a high-pressure part, and the evaporator 3 and absorber 4 form a low-pressure part.

The liquid refrigerant flowing into the evaporator 3 from the condenser 2 causes the state of pressure drop while going through a restrictor 11. The pressure drop occurs to have the refrigerant maintain its adequate condition while maintaining a pressure disparity between the condenser 2 which already has its pressure disparity and the evaporator 3. The pressure drop such as above occurs by reducing a sectional area inside the restrictor 11.

After exchanging heat between the liquid refrigerant condensed in the condenser 2 and the refrigerant vapor evaporated from the evaporator 3, the liquid refrigerant sent to the evaporator 3 is evaporated by the heat of water maintaining a high temperature and returned from the indoor unit 10 after performing the cooling work.

At this time, the temperature of the water to be sent to the evaporator 3 to evaporate the liquid refrigerant sent to the evaporator 3 into refrigerant vapor is decided according to changes in the operational condition of the evaporator 3.

The motion of the system described above is carried out continuously while maintaining its equivalence as long as the system is operated.

However, when the temperature of the water flowing into the evaporator to evaporate the liquid refrigerant in the evaporator into refrigerant vapor is lower than a predetermined temperature according to changes in the operational condition of the evaporator, the difference of the temperature between the liquid refrigerant and the water flowing into the evaporator of the conventional AAATHP becomes smaller, thus unable to evaporate the liquid refrigerant completely. The liquid refrigerant remaining without being evaporated is accumulated at the bottom of the evaporator, this causes not only the unstable operation of the system, but also the deterioration of the efficiency of the condenser.

SUMMARY OF THE INVENTION

The present invention forms an automatic switch valve to send out liquid refrigerant accumulated at the bottom of an evaporator to a rectifier. A heat exchanging pipe is also formed in the rectifier to allow the flowing of the liquid refrigerant formed in the evaporator to have it exchange its heat with refrigerant vapor sent to the rectifier from a regenerator. A 1st liquid refrigerant passage pipe is formed between the automatic switch valve and the heat exchanging pipe to allow the flowing of the liquid refrigerant accumulated at the bottom of the evaporator into the heat exchanging pipe. A 2d liquid refrigerant passage pipe is also formed between a projection formed at a restrictor which is dropping the pressure of the heat exchanging pipe and the liquid refrigerant so as to allow the flowing of the liquid refrigerant with its heat already exchanged while flowing inside the heat exchanging pipe into the evaporator along with the liquid refrigerant condensed in a condenser. With the formation of the 2d liquid refrigerant passage pipe, non-evaporated liquid refrigerant emerging as a result of changes in the operational condition of the evaporator is rectified as refrigerant vapor flowing from the regenerator to the rectifier. Thus, the present invention can improve the capability of the rectifier, and also can safely maintain the operational system of the AAATHP of the present invention.

BRIEF DESCRIPTION OF THE INVENTION

DETAILED DESCRIPTION OF THE INVENTION

Figure 1:
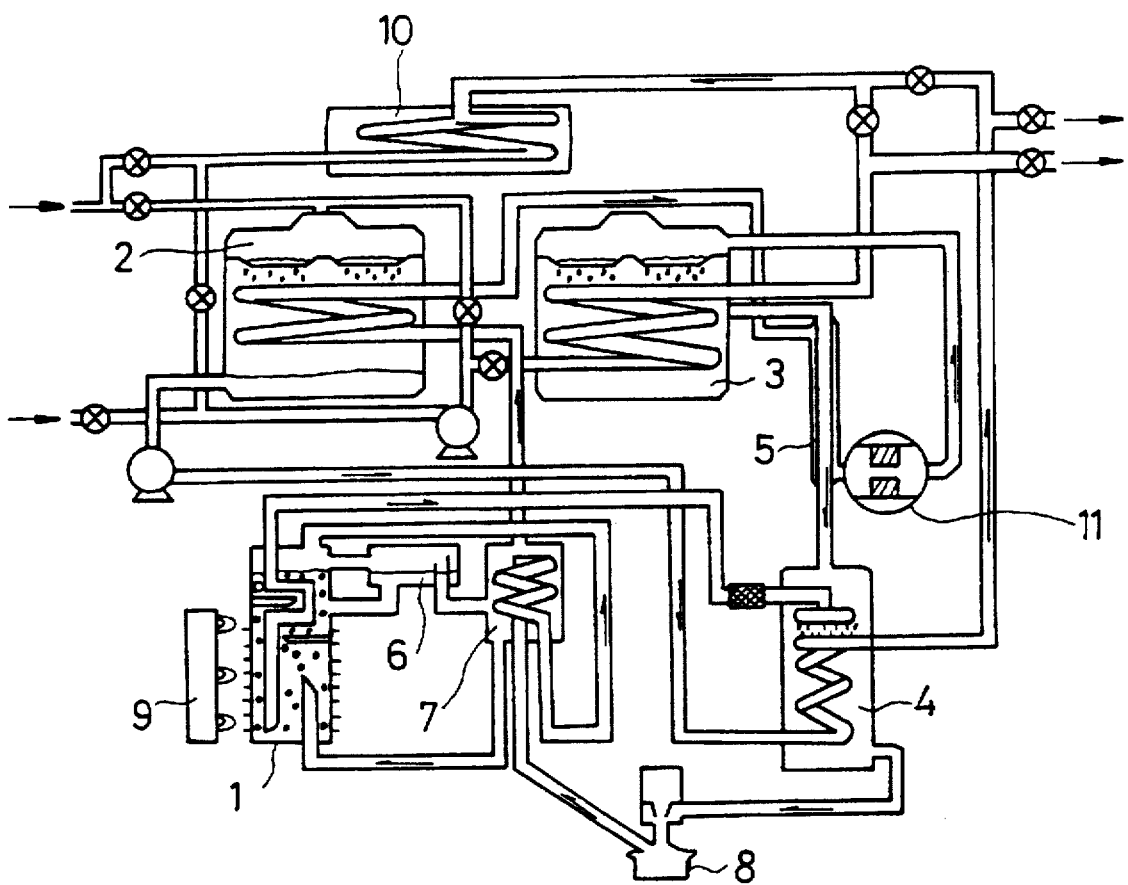
FIG. 1 shows the operational system of the conventional AAATHP.
Figure 2:
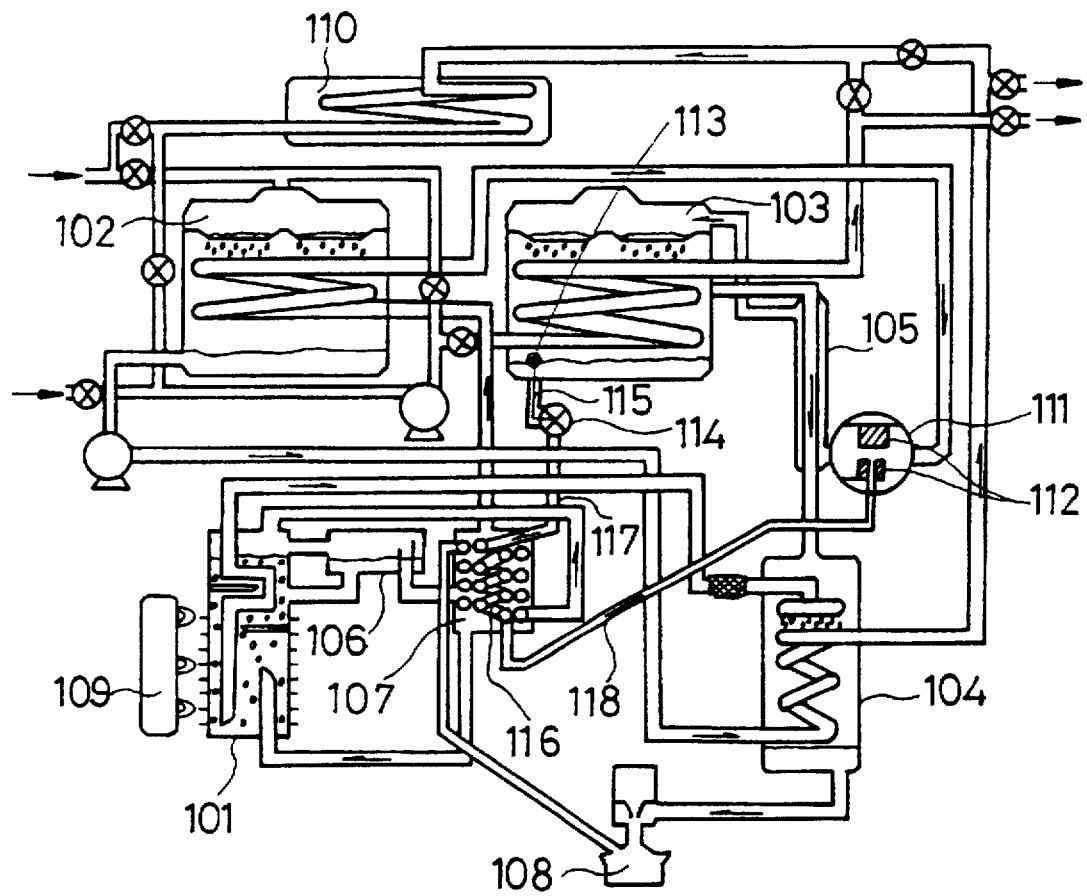
FIG. 2 shows the operational system of the AAATHP of the present invention.

As shown in the FIG. 2, an AAATHP of the present invention includes the following specific structures:

A regenerator 101 acquiring ammonia refrigerant vapor by evaporating refrigerant ammonia from strongly concentrated operating fluid (ammonia solution) gained by adding heat emitting from a burner 109, and also producing weakly concentrated ammonia solution from partially evaporated ammonia; a solution separator 106 separating drops coming inside along with refrigerant vapor evaporated from the regenerator 101, a rectifier 107 acquiring highly concentrated ammonia vapor gained by condensing moisture evaporating with the refrigerant vapor coming from the solution separator 106, a solution pump 108 providing strong solution to condense the moisture contained in the refrigerant vapor being sent to the rectifier 107, a condenser 102 condensing the refrigerant vapor coming from the regenerator 101 into liquid refrigerant by absorbing the heat from the refrigerant vapor with the use of cooled water returned from an indoor unit 110, an evaporator 103 producing the refrigerant vapor by re-evaporating the liquid refrigerant coming from the condenser 102 with the use of the water maintaining a high temperature and returning from the indoor unit 110, a restrictor 111 dropping the pressure of the liquid refrigerant coming into the evaporator 103 from the condenser 102, a projection 112 formed within the restrictor 111, a refrigerant heat exchanger 105 formed to enable the exchange of heat between the liquid refrigerant emitting from the condenser 102 and the refrigerant vapor emitting from the evaporator 103, an absorber 104 producing the strong solution of the original concentration of the regenerator 101 by absorbing the refrigerant vapor coming from the evaporator 103 by the weak solution coming from the regenerator 101, a heat exchanging pipe 116 formed to enable the flowing of the liquid refrigerant formed by the evaporator 103 into the rectifier 107 so as to assure the exchange of heat between the non-evaporated liquid refrigerant flowing from the evaporator 103 to the rectifier 107 and the refrigerant vapor flowing from the regenerator 101 to the rectifier 107, a buoy 113 floating on the free surface of the non-evaporated liquid refrigerant accumulated at the bottom of the evaporator 103, an automatic switch valve 114 adjusting the flow rate of the liquid refrigerant accumulated at the bottom of the evaporator 103 to be sent to the heat exchanging pipe 116 when the buoy moves up and down according to changes in the fluid level of the non-evaporated liquid refrigerant, a wire 115 connecting the buoy 113 and the automatic switch valve 114 to enable the opening and shutting of the automatic switch valve 114 according to the up-and-down motion of the buoy 113, a 1st liquid refrigerant passage pipe 117 formed between the automatic switch valve 114 and the heat exchanging pipe 116 so as to enable the liquid refrigerant accumulated at the bottom of the vaporator 103 to flow into the heat exchanging pipe 116, and a 2d liquid refrigerant passage pipe 118, formed between the heat exchanging pipe 116 and the projection 112 in the restrictor 111, to enable the flowing of the liquid refrigerant, which has completed its heat exchange while going through the heat exchanging pipe 116, into the evaporator 103 along with the liquid refrigerant condensed by the condenser 102.

As shown in the FIG. 2, the operational motion and effect of the present invention are as follows:

As it was described in the FIG. 2, the AAATHP of the present invention includes basically the four component elements such as the regenerator 101, condenser 102, evaporator 103 and absorber 104.

By adding the heat emitting from th-e burner 109, the regenerator 101 acquires the ammonia refrigerant vapor by evaporating th-e refrigerant ammonia from the strongly concentrated operating fluid (ammonia solution) and, at the same time, produces weakly concentrated ammonia solution (weal[] solution) from partially evaporated ammonia.

After the refrigerant vapor evaporated from the regenerator 101 is sent to the solution separator 106, the drops flowing with the refrigerant vapor is separated.

After being separated from the drops in the solution separator 106, the refrigerant vapor is sent to the rectifier 107 to be rectified as the highly concentrated refrigerant vapor, and then sent to the condenser 102.

The refrigerant vapor sent to the condenser 102 then exchanges its heat with the water maintaining a low temperature and returned from the indoor unit 110 after performing a heating work to condense the refrigerant vapor into liquid refrigerant.

After having exchanged heat with the refrigerant vapor, the water is sent to the absorber 104 through the condenser 102.

After being dropped of the pressure of the liquid refrigerant condensed in the condenser 102 while passing through the projection 112 formed in the restrictor 111 maintaining a reduced sectional area, the condensed liquid refrigerant exchange its heat with the refrigerant vapor evaporated from the evaporator 103 in the refrigerant heat exchanger 105, and then the condensed liquid refrigerant is sent to the evaporator 103.

In order to convert the liquid refrigerant in the evaporator 103 into the refrigerant vapor, the liquid refrigerant is evaporated into the refrigerant vapor with the necessary heat gained from the water returned from the indoor unit 110 after performing the cooling work and maintaining a raised temperature.

The water being absorbed of its heat as described above is further cooled down, and is then sent to the indoor unit 110 to perform the cooling work again.

The refrigerant vapor being evaporated from the evaporator 103 is sent to the absorber 104 after exchanging its heat with the liquid refrigerant condensed by the condenser 102 of the heat exchanger 105.

Through the exchange of the heat between the liquid refrigerant stemming from the condenser 102 and the refrigerant vapor stemming from the evaporator 103, the refrigerant heat exchanger 105 drop the temperature of the liquid refrigerant close to the evaporating temperature of the evaporator 103 while raising the temperature of the refrigerant vapor close to the saturation temperature of the absorber 104. Thus facilitate the action of absorption.

The extremely small amount of non-evaporated refrigerant remaining inside the evaporator 103 is also evaporated.

The absorber 104 enables the weak solution flowing from the regenerator 101 to absorb the refrigerant vapor coming from the evaporator 103 to form the strong solution originally concentrated by the regenerator 101.

At this time, form the elimination of the heat to facilitate the action of the absorber 104, the water passing through the condenser 102 is used.

The water heated by the absorber 104 above is then sent to the idoor unit 110 to perform the heating work again.

In other words, the water being dropped of its temperature in the evaporator 103 is sent to the indoor unit 110 to perform the cooling work, and the water which has cooled the condenser 102 and the absorber 104 is raised of its temperature and is thus sent to the outdoor unit to cool down the water again.

Contrary to the above, the water being raised of its temperature while going through the condenser 102 and the absorber 104 is sent to the indoor unit 110 to perform the heating work, and the water passing through the evaporator 103 is sent to the outdoor unit.

When the liquid refrigerant sent to the evaporator 103 failed to evaporate completely, the non-evaporated liquid refrigerant is accumlated at the bottom of the evaporator 103. The buoy 113 floating on the free surface of the non-evaporated liquid refrigerant opens and closes the automatic switch valve 114 being connected with the buoy 113 by a wire 115 as moving up and down according to the change in the fluid water level of the free surface.

When the water level of the non-evaporated liquid refrigerant accumulated inside the evaporator 103 rises, the buoy 113 also rises up and pulls the wire 115 being connected to the buoy 113. The wire then opens the automatic switch valve 114 being connected to the other end of the wire 115.

When the automatic switch valve 114 is opened, the non-evaporated liquid refrigerant accumulated inside the evaporator 103 is sent to the heat exchanging pipe 116 formed in the rectifier 107 through the 1st liquid refrigerant passage pipe 117. Along with the strong solution formed by the absorber 104 and flowing through other passage, and sent to the rectifier 107 by the pumping of the solution pump 108, the non-evaporated liquid refrigerant in the heat exchanging pipe 116 then rectifies the refrigerant vapor sent to the rectifier 107 from the regenerator 101 into highly concentrated refrigerant vapor.

At this time, the heat exchanging pipe 116 sending the non-evaporated liquid refrigerant into the rectifier 107, and the strong solution coil pipe sending the strong solution into the rectifier 107 by the pumping of the solution pump 108, are formed by separate pipes.

The non-evaporated liquid refrigerant, which has exchanged its heat with the refrigerant vapor sent from the regenerator 101 while flowing through the heat exchanging pipe 116, flows through the 2d liquid refrigerant passage pipe 118 formed between the projection 112 in the heat exchanging pipe 116 and the restrictor 111. After coming out to the restrictor 111 through the projection 112, the non-evaporated liquid refrigerant joins with the liquid refrigerant condensed at the condenser 102, and then flow into the evaporator 103.

The passage sectional area of the restrictor 111 is diminished at the portion of the projection 112, and the pressure of the liquid refrigerant condensed by the condenser 102 is dropped at the restrictor 111, thus, the flowing velocity of the condensed liquid refrigerant is accelerated at the sectional area reduced portion of the projection 112. Because of the loss of the pressure, a difference in the flowing pressure of the refrigerant is maintained between the condenser 102 and the evaporator 103.

The above phenomenon can be explained by the following Bernoulli's Equation:

$$P_1/P + V_1^2/2 + gz_1 = P_2/P + V_2^2/2 + gz_2$$

$P_1$: Pressure on the entire point of the passage sectional area reduced portion.

$P_2$: Pressure on the passage sectional area reduced portion.

P: The density of the fluid.

$V_1$: The flowing velocity of the fluid at the entire point of the passage sectional area reduced portion.

$Z_1$: The head of the entire point of the pasage sectional area reduced portin.

$V_2$: The flowing velocity of the fluid at the entire passage sectional area reduced portion.

$Z_2$: The head of the entire portion of the passage sectional area reduced portion.

If there is no difference in the location of the entire reduced sectional area and the reduced portion, the following pressure difference occurs:

$$dp = P_1 - P_2 = P(V_2^2 - V_1^2)/2$$

Since the value of the pressure difference emerges in proportion to a square, if the sectional area of the reduced portion is reduced beyond a predetermined area, the pressure difference drops to a great extent, and subsequently becomes smaller than the pressure of the evaporator 103.

The reason is that in case of a phenomenal change in the passage such as a sectional area reduction, and the passage becomes the same sectional area maintained before the reduction of the sectional area after the greatest loss of pressure occurred at the sectional area reduced portion, the loss of pressure is equal to that of the pressure loss caused by the phenomenal change and the pressure loss caused by a friction.

Therefore, the pressure of the passage sectional area reduced portion of the restrictor 111 becomes smaller due to the phenomenal change of the restrictor 111, and after the restrictor, a pressure loss by passage sectional area reduction and a friction is occurred, thus a pressure difference of the refrigerant against a pressure difference between the condenser 102 and the evaporator 103 is also created.

The non-evaporated liquid refrigerant accumulated at the bottom of the evaporator 103 by the pressure difference of the restrictor passage sectional area reduced portion is evaporated partially by the exchange of heat while being sent to the rectifier 107 through the evaporator 103, while sending the rest of the non-evaporated liquid refrigerant to the projection 112, the sectional area reduced portion, formed at the restrictor 111, and is then sent with the liquid refrigerant condensed by the condenser 102 to the evaporator 103.

The operational motion described above is carried out as long as the operational system of the present invention is sustained on a basis of continuous circulation while maintaining equivalence. As it was explained above in detail, a portion of the liquid refrigerant sent to the evaporator to evaporate it as refrigerant vapor is accumulated at the bottom of the evaporator as non-evaporated liquid refrigerant according to changes in the operational condition of the water. The non-evaporated liquid refrigerant is, however, sent to the rectifier to rectify the refrigerant vapor sent to the rectifier from the regenerator, thus improve not only the efficiency of the condenser but also the rectifying efficiency of the rectifier.

In addition to the above, the deterioration of the efficiency of the evaporator to be caused by a drop in the temperature of the outdoor unit during the heating can be solved by evaporating the non-evaporated liquid refrigerant by the evaporator with the use of rectifying heat, thus safely maintain the operational system of the AAATHP.

What is claimed is:

1. A heat exchange system comprising:
    a regenerator generating refrigerant vapor;
    a rectifier coupled to the regenerator and receiving the refrigerant vapor generated by the regenerator;
    an evaporator containing liquid refrigerant;
    a first pipe conducting liquid refrigerant from the evaporator to the rectifier;
    a heat exchanging pipe disposed in the rectifier and coupled to the first pipe, the heat exchanging pipe exchanging heat between the liquid refrigerant from the evaporator with the refrigerant vapor from the regenerator;
    a second pipe coupled to the heat exchanging pipe and coupled to the evaporator, the second pipe conducting liquid refrigerant from the heat exchanging pipe to the evaporator;
    a restrictor coupled to the second pipe and coupled to the evaporator; and further comprising a valve in the first pipe, the valve controlling the conduction of the liquid refrigerant from the evaporator to the rectifier.

2. A heat exchange system as set forth in claim 1, further comprising a condenser coupled to the evaporator.

3. A heat exchange system as set in claim 1, further comprising a control means for controlling the conduction of the liquid refrigerant from the evaporator to the rectifier.

4. A heat exchange system of claim 5, further comprising a buoy disposed in the evaporator and coupled to the valve, the buoy controlling the operation of the valve in response to a level of the liquid refrigerant in the evaporator.

5. A heat exchange system comprising:
    a regenerator generating refrigerant vapor;
    a rectifier coupled to the regenerator and receiving the refrigerant vapor generated by the regenerator;
    an evaporator containing liquid refrigerant;
    a first pipe conducting liquid refrigerant from the evaporator to the rectifier;
    a heat exchanging pipe disposed in the rectifier and coupled to the first pipe, the heat exchanging pipe exchanging heat between the liquid refrigerant from the evaporator with the refrigerant vapor from the regenerator;
    a second pipe coupled to the heat exchanging pipe and coupled to the evaporator, the second pipe conducting liquid refrigerant from the heat exchanging pipe to the evaporator;
    a restrictor coupled to the second pipe and coupled to the evaporator
    a control means for controlling the conduction of the liquid refrigerant from the evaporator to the rectifier; and wherein the control means includes a buoy disposed in the evaporator which is coupled to a valve in the first pipe.

6. A heat exchange system comprising:
    a regenerator generating refrigerant vapor;
    a rectifier coupled to the regenerator and receiving the refrigerant vapor generated by the regenerator;
    an evaporator containing liquid refrigerant;
    a first pipe conducting liquid refrigerant from the evaporator to the rectifier;
    a heat exchanging pipe disposed in the rectifier and coupled to the first pipe, the heat exchanging pipe exchanging heat between the liquid refrigerant from the evaporator with the refrigerant vapor from the regenerator;
    a second pipe coupled to the heat exchanging pipe and coupled to the evaporator, the second pipe conducting liquid refrigerant from the heat exchanging pipe to the evaporator;
    a restrictor coupled to the second pipe and coupled to the evaporator.

7. A heat exchange system as set forth in claim 1, wherein the liquid refrigerant is ammonia.

8. A heat exchange system as in claim 1, in which the system comprises an ammonia aqua absorption type heat pump.

9. A heat pump comprising:
    a regenerator generating refrigerant vapor by evaporating liquid refrigerant;
    an evaporator generating refrigerant vapor by evaporating liquid refrigerant contained in the evaporator;
    a condenser coupled to the regenerator and condensing the refrigerant vapor generated by the regenerator into liquid refrigerant;

a rectifier coupled to the regenerator and receiving the refrigerant vapor generated by the regenerator;

a first pipe conducting liquid refrigerant from the evaporator to the rectifier;

a heat exchange pipe disposed in the rectifier and coupled to the first pipe, the heat exchange pipe exchanging the heat of the liquid refrigerant from the evaporator with the refrigerant vapor from the regenerator;

a second pipe coupled to the heat exchange pipe and conducting liquid refrigerant from the heat exchange pipe; and a restrictor coupled to the condenser, coupled to the second passage pipe and coupled to the evaporator, the restrictor reducing the pressure of liquid refrigerant from the condenser and reducing the pressure of liquid refrigerant from second pipe.

10. A heat pump as set forth in claim 9, further comprising an indoor unit coupled to the condenser and coupled to the evaporator.

11. A heat pump as set forth in claim 9, further comprising an automatic control valve in the first pipe, the automatic control valve controlling the flow of liquid refrigerant from the evaporator to the heat exchange pipe.

12. A heat pump as set forth in claim 11, further comprising a level detector detecting a level of liquid refrigerant in the evaporator, the level detector being coupled to the automatic control valve and controlling the operation of the automatic control valve in response to the level of liquid refrigerant in the evaporator.

13. An ammonia aqua absorption type heat pump, comprising:

a regenerator for producing first refrigerant vapor;

a condenser coupled to the regenerator;

an evaporator for producing second refrigerant vapor;

an absorber coupled to the evaporator;

a rectifier coupled to the absorber and to the condenser; and an automatic switch valve structured to enable sending liquid refrigerant accumulated at a bottom portion of the evaporator to the rectifier.

14. A method of operating a heat exchange system comprising the steps of:

generating first refrigerant vapor by evaporating liquid refrigerant in an evaporator;

exchanging heat of unevaporated liquid refrigerant from the evaporator with second refrigerant vapor;

conducting the heat exchanged liquid refrigerant back to the evaporator; and further comprising reducing the pressure of the heat exchanged liquid refrigerant during its conduction back to the evaporator.

15. The method as set forth in claim 14, further comprising the steps of:

conducting the unevaporated liquid refrigerant out of the evaporator; and automatically controlling the conduction of the unevaporated liquid refrigerant.

* * * * *